United States Patent
Feng et al.

(10) Patent No.: US 12,429,983 B2
(45) Date of Patent: Sep. 30, 2025

(54) TOUCH DISPLAY DEVICE, METHOD FOR CONTROLLING SAME, AND COMPUTER STORAGE MEDIUM

(71) Applicants: BOE Intelligent IoT Technology Co., LTD., Beijing (CN); BOE Technology Group Co., Ltd., Beijing (CN)

(72) Inventors: Pengpeng Feng, Beijing (CN); Jiashuang Zong, Beijing (CN); Mingyuan Ma, Beijing (CN)

(73) Assignees: BOE Intelligent IoT Technology Co., LTD., Beijing (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 18/293,312

(22) PCT Filed: Feb. 17, 2023

(86) PCT No.: PCT/CN2023/076904
§ 371 (c)(1),
(2) Date: Jan. 29, 2024

(87) PCT Pub. No.: WO2023/207272
PCT Pub. Date: Nov. 2, 2023

(65) Prior Publication Data
US 2025/0094002 A1 Mar. 20, 2025

(30) Foreign Application Priority Data
Apr. 28, 2022 (CN) .......................... 202210463359.7

(51) Int. Cl.
*G06F 3/042* (2006.01)
*G06F 3/041* (2006.01)

(52) U.S. Cl.
CPC .......... *G06F 3/0421* (2013.01); *G06F 3/0412* (2013.01); *G06F 3/04166* (2019.05); *G06F 3/04186* (2019.05); *G06F 2203/04102* (2013.01)

(58) Field of Classification Search
CPC ......... G06F 3/0421; G06F 2203/04102; G06F 3/0412; G06F 3/04186; G06F 3/04166
See application file for complete search history.

(56) References Cited

U.S. PATENT DOCUMENTS

| | | | | |
|---|---|---|---|---|
| 4,888,479 A | * | 12/1989 | Tamaru | G06F 3/0421 250/221 |
| 4,933,544 A | * | 6/1990 | Tamaru | G01V 8/20 250/221 |

(Continued)

FOREIGN PATENT DOCUMENTS

| CN | 103365492 A | 10/2013 |
|---|---|---|
| CN | 104298394 A | 1/2015 |

(Continued)

*Primary Examiner* — Xuemei Zheng
(74) *Attorney, Agent, or Firm* — IPro, PLLC

(57) ABSTRACT

Provided is a touch display device, including: a curved display screen and at least two optical pair transistor groups. The display screen has a curved first edge and a curved second edge. The optical pair transistor group includes a plurality of through-beam units. Each through-beam unit includes an emitter, disposed on an outer side of the first edge, and a receiver, disposed on an outer side of the second edge. A light outlet of the emitter is oriented towards a light inlet of the receiver. The at least two optical pair transistor groups include a first optical pair transistor group and a second optical pair transistor group. An extension direction of a light ray emitted by the through-beam unit in the first optical pair transistor group is intersected with an extension direction of a light ray emitted by the through-beam unit in the second optical pair transistor group.

16 Claims, 9 Drawing Sheets

(56) References Cited

U.S. PATENT DOCUMENTS

| | | | | |
|---|---|---|---|---|
| 5,414,413 A | * | 5/1995 | Tamaru | G06F 3/0421 345/173 |
| 2012/0105377 A1 | * | 5/2012 | Takeno | G06F 3/04166 345/175 |
| 2012/0218230 A1 | * | 8/2012 | Zhao | G06F 3/0421 345/175 |
| 2016/0306498 A1 | | 10/2016 | Wang et al. | |
| 2017/0131846 A1 | * | 5/2017 | Huitema | G06F 3/0421 |
| 2018/0074655 A1 | | 3/2018 | Xu et al. | |

FOREIGN PATENT DOCUMENTS

| | | |
|---|---|---|
| CN | 204178348 U | 2/2015 |
| CN | 106406639 A | 2/2017 |
| CN | 106708334 B | 11/2020 |
| CN | 115079861 A | 9/2022 |
| JP | 2013058084 A | 3/2013 |
| KR | 20140140261 A | 12/2014 |

\* cited by examiner

TOUCH DISPLAY DEVICE, METHOD FOR CONTROLLING SAME, AND COMPUTER STORAGE MEDIUM

CORRS-REFERENCE TO RELATED APPLICATION

This application is a U.S. national stage of international application No. PCT/CN2023/076904, field on Feb. 17, 2023, which claims priority to Chinese Patent Application No. 202210463359.7, filed on Apr. 28, 2022, and entitled "TOUCH DISPLAY DEVICE, CONTROL METHOD AND COMPUTER STORAGE MEDIUM," the contents of which are herein incorporated by reference in their entireties.

TECHNICAL FIELD

The present disclosure relates to the field of display technologies, and in particular, relates to a touch display device, a method for controlling the same, and a non-transitory computer storage medium.

BACKGROUND

Nowadays, touch display devices are widely used in display devices having display functions, such as advertising screens, televisions, or computers, such that the display devices have the human-computer interaction function.

SUMMARY

Embodiments of the present disclosure provide a touch display device, a method for controlling the same, and a non-transitory computer storage medium. The technical solutions are as follows.

According to some embodiments of the present disclosure, a touch display device is provided. The touch display device includes:
  a display screen and at least two optical pair transistor groups, wherein the display screen includes a curved screen;
  the display screen has a first edge and a second edge that are opposite to each other, wherein the first edge and the second edge are both curved;
  the optical pair transistor group includes a plurality of through-beam units, wherein each of the through-beam units includes an emitter and a receiver, the emitter is disposed on an outer side of the first edge, the receiver is disposed on an outer side of the second edge, and a light outlet of the emitter is oriented towards a light inlet of the receiver; and
  the at least two optical pair transistor groups include a first optical pair transistor group and a second optical pair transistor group, wherein an extension direction of a light ray emitted by the through-beam unit in the first optical pair transistor group is intersected with an extension direction of a light ray emitted by the through-beam unit in the second optical pair transistor group.

In some embodiments, a preset included angle is formed between the extension direction of the light ray emitted by the through-beam unit in at least one of the at least two optical pair transistor groups and a first direction, wherein the first direction is a direction perpendicular to the first edge, and the preset included angle is greater than 0 degrees and less than 90 degrees.

In some embodiments, the first optical pair transistor group includes a first oblique through-beam unit, wherein a preset included angle is formed between an extension direction of a light ray emitted by the first oblique through-beam unit and the first direction along a clockwise direction; and
  the second optical pair transistor group includes a second oblique through-beam unit, wherein a preset included angle is formed between an extension direction of a light ray emitted by the second oblique through-beam unit and the first direction along a counterclockwise direction.

In some embodiments, the first optical pair transistor group includes a first oblique through-beam unit, wherein a preset included angle is formed between an extension direction of a light ray emitted by the first oblique through-beam unit and the first direction; and
  the second optical pair transistor group includes a vertical through-beam unit, wherein an extension direction of a light ray emitted by the vertical through-beam unit is parallel to the first direction.

In some embodiments, the at least two optical pair transistor groups further include a third optical pair transistor group, wherein an extension direction of a light ray emitted by a through-beam unit in the third optical pair transistor group is intersected with the extension direction of the light ray emitted by the through-beam unit in the first optical pair transistor group and the extension direction of the light ray emitted by the through-beam unit in the second optical pair transistor group.

In some embodiments, the first optical pair transistor group includes a first oblique through-beam unit, wherein a preset included angle is formed between an extension direction of a light ray emitted by the first oblique through-beam unit and the first direction along a clockwise direction;
  the second optical pair transistor group includes a vertical through-beam unit, wherein an extension direction of a light ray emitted by the vertical through-beam unit is parallel to the first direction; and
  the at least two optical pair transistor groups further include a third optical pair transistor group, wherein the third optical pair transistor group includes a third oblique through-beam unit, and a preset included angle is formed between an extension direction of a light ray emitted by the third oblique through-beam unit and the first direction along a counterclockwise direction.

In some embodiments, the first optical pair transistor group and the second optical pair transistor group are disposed in a same layer, and the through-beam units in the first optical pair transistor group and the through-beam units in the second optical pair transistor group are alternately arranged in an extension direction of the first edge of the display screen; or
  the first optical pair transistor group and the second optical pair transistor group are stacked along a direction away from the display screen.

In some embodiments, the first optical pair transistor group, the second optical pair transistor group, and the third optical pair transistor group are disposed in a same layer, and the through-beam units in the first optical pair transistor group and the through-beam units in the second optical pair transistor group are alternately arranged in an extension direction of the first edge of the display screen; or
  the first optical pair transistor group, the second optical pair transistor group, and the third optical pair transistor group are stacked along a direction away from the display screen.

In some embodiments, the display screen further has a third edge and a fourth edge that are opposite to each other, wherein two ends of the third edge are respectively connected to the first edge and the second edge, and two ends of the fourth edge are respectively connected to the first edge and the second edge; and the at least two optical pair transistor groups further include a supplemental emitter and a supplemental receiver that are disposed on outer sides of the third edge and the fourth edge, wherein a light outlet of the supplemental emitter is oriented towards the light inlet of the receiver disposed on the outer side of the second edge, and a light inlet of the supplemental receiver is oriented towards the light outlet of the emitter disposed on the outer side of the first edge.

In some embodiments, an angular range of the preset included angle satisfies the following equation:

$$10° \leq \theta \leq \arctan\left(\frac{2}{L} * \sqrt{R^2 - (R-H)^2}\right);$$

wherein θ represents the preset included angle, L represents a distance between the first edge and the second edge, R represents a radius of the first edge, and H represents a preset distance between the light ray emitted by the through-beam unit of at least one of the optical pair transistor groups and a display surface of the display screen in a direction perpendicular to the display surface of the display screen.

According to some embodiments of the present disclosure, a method for controlling a touch display device is provided. The method is applicable to the touch display device describe above. The method includes:

performing scanning actions of at least two optical pair transistor groups;

acquiring scanning results of the at least two optical pair transistor groups; and determining touch information based on the scanning results.

In some embodiments, the at least two optical pair transistor groups include a first optical pair transistor group and a second optical pair transistor group; and performing the scanning actions of the at least two optical pair transistor groups includes:

performing a scanning action of the first optical pair transistor group; and performing a scanning action of the second optical pair transistor group upon a delay of a first period;

wherein the first period is less than a period of performing the scanning action of the first optical pair transistor group.

In some embodiments, the at least two optical pair transistor groups further include a third optical pair transistor group; an determining the touch information based on the scanning results includes:

acquiring scanning results of the first optical pair transistor group and the second optical pair transistor group, and acquiring a first touch position based on the scanning results of the first optical pair transistor group and the second optical pair transistor group; and acquiring a scanning result of the third optical pair transistor group, and acquiring the touch information based on the scanning result of the third optical pair transistor group and the first touch position.

In some embodiments, the touch display device further includes:

a scanning module, configured to perform scanning actions of at least two optical pair transistor groups;

an acquiring module, configured to acquire scanning results of the at least two optical pair transistor groups; and a determining module, configured to determine touch information based on the scanning results.

In some embodiments, the at least two optical pair transistor groups include a first optical pair transistor group and a second optical pair transistor group; and the scanning module includes:

a first scanning unit, configured to perform a scanning action of the first optical pair transistor group; and a delay scanning unit, configured to perform a scanning action of the second optical pair transistor group after a delay of a first period;

wherein first period is less than a period of performing the scanning action of the first optical pair transistor group.

According to some embodiments of the present disclosure, a touch display device is provided. The touch display device includes a processor and a memory storing at least one instruction, at least one program, at least one code set, or at least one instruction set. The processor, under a condition of loading and executing the at least one instruction, the at least one program, the at least one code set, or the at least one instruction set, is caused to perform the method for controlling the touch display device as described above.

According to some embodiments of the present disclosure, a non-transitory computer storage medium storing at least one instruction, at least one program, at least one code set, or at least one instruction set is provided. A processor, under a condition of loading and executing the at least one instruction, the at least one program, the at least one code set, or the at least one instruction set, is caused to perform the method for controlling the touch display device as described above.

According to some embodiments of the present disclosure, a computer program product or a computer program is provided. The computer program product or the computer program includes at least one computer instruction stored in a computer-readable storage medium. A processor of a computer device, under a condition of loading and executing the at least one computer program, is caused to perform the method for controlling the touch display device as described above.

BRIEF DESCRIPTION OF DRAWINGS

For clearer descriptions of the technical solutions in the embodiments of the present disclosure, the following briefly introduces the accompanying drawings to be required in the descriptions of the embodiments. Apparently, the accompanying drawings in the following description show merely some embodiments of the present disclosure, and persons of ordinary skills in the art may still derive other drawings from these accompanying drawings without creative efforts.

Exemplary embodiments of the present disclosure, illustrated by the accompanying drawings described above, will be described in greater detail hereinafter. These accompanying drawings and textual descriptions are not intended to limit the scope of the concept of the present disclosure in any form, but rather to illustrate the concept of the present disclosure for those skilled in the art by reference to particular embodiments.

DETAILED DESCRIPTION

The present disclosure is described in further detail with reference to the accompanying drawings, to clearly present the objects, technical solutions, and advantages of the present disclosure.

A touch display device includes a display screen and an optical pair transistor group. The display screen is a curved screen, and the optical pair transistor group includes emitters and receivers that are disposed at edges around the perimeter of the display screen. The emitters and the receivers, which are in one-to-one correspondence to each other, form a grid-like light scanning plane on a surface of the display screen. In the case that a user touches the display screen, the user's finger or other objects block light rays passing through the touch point, such that the touch point is located.

However, the touch identification of the touch display device described above has a low accuracy.

Figure 1:
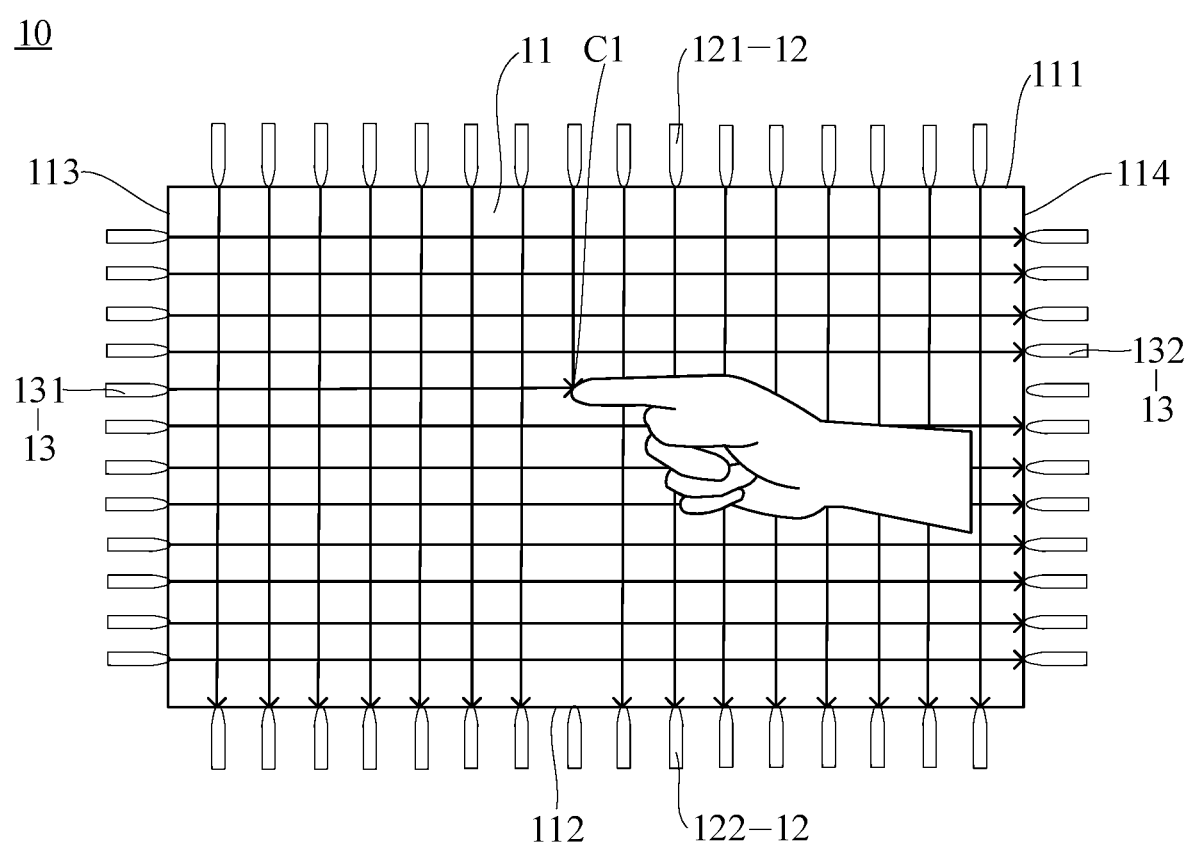
FIG. 1 is a schematic structural diagram of a touch display device.

FIG. 1 is a schematic structural diagram of a touch display device. The touch display device 10 includes a display screen 11, a first optical pair transistor group 12, and a second optical pair transistor group 13. The display screen 11 is a curved screen. The first optical pair transistor group 12 includes a plurality of first emitters 121 and a plurality of first receivers 122, and the second optical pair transistor group 13 includes a plurality of second emitters 131 and a plurality of second receivers 132. The display screen 11 includes a first edge 111 and a second edge 112 that are opposite to each other. The plurality of first emitters 121 in the first optical pair transistor group 12 are disposed on an outer side of the first edge 111, the plurality of first receivers 122 in the first optical pair transistor group 12 are disposed on an outer side of the second edge 112, and a plurality of horizontal light rays are formed on a surface of the display screen 11. The display screen 11 includes a third edge 113 and a fourth edge 114 that are opposite to each other. The plurality of second emitters 131 in the second optical pair transistor group 13 are disposed on an outer side of the third edge 113, the plurality of second receivers 132 in the second optical pair transistor group 13 are disposed on an outer side of the fourth edge 114, and a plurality of vertical light rays are formed on the surface of the display screen 11.

The plurality of horizontal light rays and vertical light rays form a grid-like light scanning plane on the surface of the display screen 11. In the case that a user touches the display screen, the user's finger or other object blocks the light rays passing through a touch point, and the touch display device 10 determines a vertical coordinate of the touch point C1 by the horizontal light rays and determines a horizontal coordinate of the touch point C1 by the vertical light rays, such that the touch point is positioned.

However, in the case that the first edge 111 and the second edge 112 of the display screen 11 are curved, the horizontal light rays formed by the second optical pair transistor group 13 of the touch display device 10 are distal from the surface of the display screen 11, and thus the accuracy of the touch identification of the touch display device 10 is low. Moreover, because the optical pair transistor groups (the first optical pair transistor group 12 and the second optical pair transistor group 13) are arranged on the edges around a perimeter of the display screen 11 of the touch display device 10, the optical pair transistor groups occupy a large space in a peripheral region of the display screen 11.

Some embodiments of the present disclosure provide a touch display device, a method for controlling the same, and a computer storage medium, which solve the problems in the related art.

Figure 2:
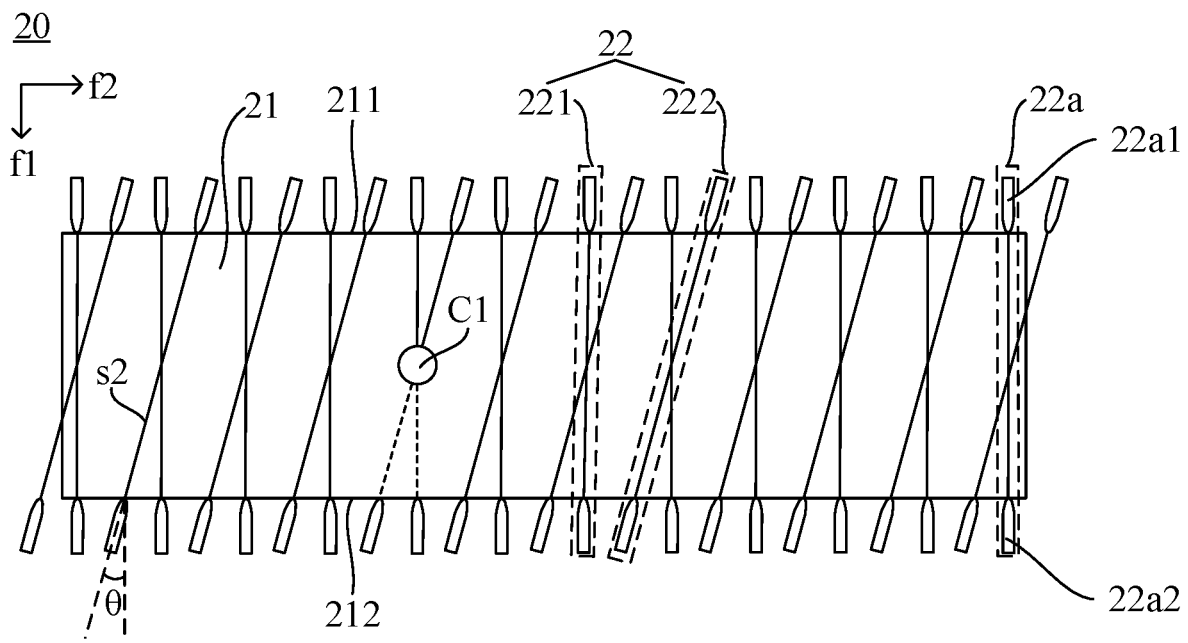
FIG. 2 is a schematic structural diagram of a touch display device according to some embodiments of the present disclosure.
Figure 3:
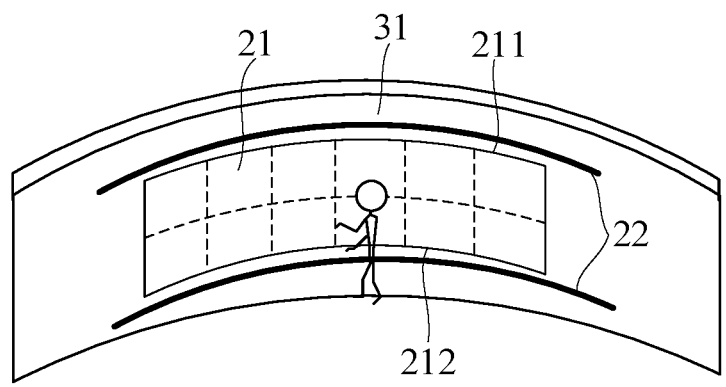
FIG. 3 is a schematic structural diagram of a display screen according to some embodiments of the present disclosure.

FIG. 2 is a schematic structural diagram of a touch display device according to some embodiments of the present disclosure. FIG. 3 is a schematic structural diagram of a display screen according to some embodiments of the present disclosure. Referring to FIG. 2 and FIG. 3, the touch display device 20 includes a display screen 21 and at least two optical pair transistor groups 22. The display screen 21 has a first edge 211 and a second edge 212 that are opposite to each other. In some embodiments, as illustrated in FIG. 2, the first edge 211 and the second edge 212 are respectively an upper edge and a lower edge of the display screen 21.

The display screen 21 includes a curved screen. The first edge 211 and the second edge 212 of the display screen 21 are both curved. The first edge 211 and the second edge 212 of the display screen 21 are parallel to each other. The curved screen is a large-sized curved screen formed by splicing a plurality of small-sized curved screens.

The curved screen refers to a screen whose display surface has a curvature, i.e., a screen in a curved form. The curvature of the curved screen is typically substantially consistent with the curvature of the human eyeball, which is more consistent with the shape of the human eye in terms of ergonomics, such that different positions on the display surface of the curved screen are at equal distances from the eye, thereby eliminating visual distortions at the edges of the flat display surface. Furthermore, the display surface of the curved screen achieves a more excellent viewing angle.

Each of the at least two optical pair transistor groups 22 includes a plurality of through-beam units 22a. Each of the through-beam units 22a includes an emitter 22a1 and a receiver 22a2. The emitter 22a1 is disposed on an outer side of the first edge 211, and the receiver 22a2 is disposed on an outer side of the second edge 212. A light outlet of the emitter 22a1 is oriented toward a light inlet of the receiver 22a2. The emitter 22a1 is configured to emit light and the receiver 22a2 is configured to receive the light emitted by the emitter 22a1. The plurality of emitters 22a1 and the plurality of receivers 22a2 in the at least two optical pair transistor groups 22 are respectively disposed on the outer sides of the two edges of the display screen 21.

The at least two optical pair transistor groups 22 include a first optical pair transistor group 221 and a second optical pair transistor group 222. An extension direction of the light ray emitted by the through-beam unit 22a in the first optical pair transistor group 221 is intersected with an extension direction of the light ray emitted by the through-beam unit 22a in the second optical pair transistor group 222.

The emitters 22a1 of the through-beam units 22a in the first optical pair transistor group 221 and the second optical pair transistor group 222 are disposed on the same edge of the display screen 21, and the receivers 22a2 of the through-beam units 22a in the first optical pair transistor group 221 and the second optical pair transistor group 222 are disposed on the same edge of the display screen 21.

The light emitted by the through-beam units 22a in the first optical pair transistor group 221 and the light emitted by the through-beam units 22a in the second optical pair transistor group 222 form a grid-like light scanning plane on a surface of the display screen 21. In the case that a user touches the surface of the display screen 21 with a finger, a stylus, or the like, at least two light rays are blocked. Because positions of the transmitter 22a1 and the receiver 22a2 corresponding to each light ray are fixed, a position of a touch point C1 of the user on the display screen 21 is acquired based on the positions of the transmitters 22a1 and the receivers 22a2 corresponding to the blocked light rays and inclination angles of the light rays.

Figure 4:
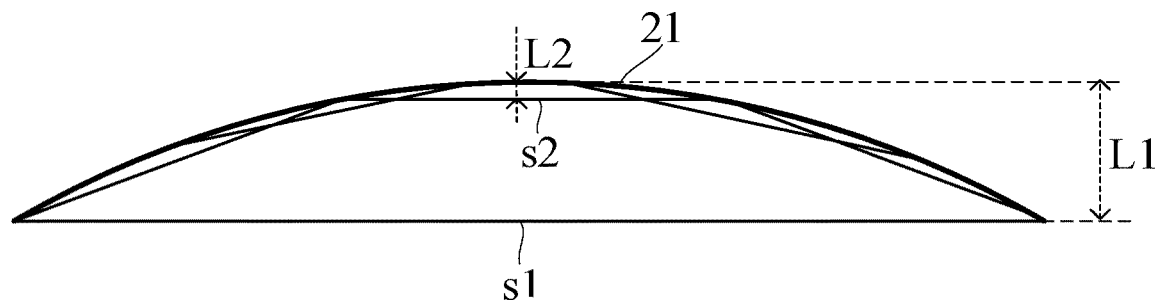
FIG. 4 is a schematic structural diagram of the display screen illustrated in FIG. 3 in another orientation.

FIG. 4 is a schematic structural diagram of the display screen illustrated in FIG. 3 in another orientation, which illustrates a schematic structural diagram of the display screen 21 in FIG. 3 viewing from the first edge 211 to the second edge 212. Referring to FIG. 4, the curved screen has a curvature. Therefore, in the case that the touch display device in the related art is used, i.e., the second optical pair transistor group 13 of FIG. 1 is deployed on the display screen 21 in FIG. 3 or FIG. 4 and a plurality of horizontal light rays s1 are formed on the surface of the display screen 21, distances L1 from the plurality of horizontal light rays s1 to a middle portion of the display screen 21 are large. As a result, the position of the touch point C1 determined by the first optical pair transistor group 12 is inaccurate.

In some embodiments, horizontal and vertical coordinates of the touch point C1 are determined based on the plurality of light rays, whose extension directions are intersected, which are formed by the at least two optical pair transistor groups 22 on the surface of the display screen 21, and thus the position of the touch point C1 is determined. Moreover, compared to the distances L1 between the light rays s2 emitted by the first optical pair transistor group 12 and the middle portion of the display screen 21 in the related art, in the embodiments of the present disclosure, distances L2 between the light rays s2 emitted by the two optical pair transistor groups 22 disposed on the outer sides of the curved first edge 211 and the curved second edge 212 and the display screen 21 are smaller, such that the detection accuracy of the touch display device 20 is improved and the accuracy of the touch identification of the display device 20 is improved.

In addition, the position of the touch point is determined by only arranging the optical pair transistor groups 22 on two edges of the display screen 21, such that the space occupied by the optical pair transistor groups in the peripheral region of the display screen 21 is reduced, and the structure of the touch display device is also simplified.

It should be noted that the dashed box corresponding to the first optical pair transistor group 221 in FIG. 2 indicates one through-beam unit 22a in the first optical pair transistor group 221, and the first optical pair transistor group 221 includes a plurality of through-beam units 22a. Similarly, the dashed box corresponding to the second optical pair transistor group 222 indicates one through-beam unit 22a in the second optical pair transistor group 222, and the second optical pair transistor group 222 includes a plurality of through-beam units 22a.

In summary, the embodiments of the present disclosure provide a touch display device, which includes the display screen and at least two optical pair transistor groups. The plurality of emitters and the plurality of receivers in the at least two optical pair transistor groups are respectively disposed on the outer sides of two curved edges of the display screen. The extension directions of the light rays emitted by the through-beam units in the at least two optical pair transistor groups are intersected, such that the grid-like light scanning plane is formed on the surface of the display screen, and thus the position of the touch point of the user on the display screen is acquired based on the light scanning plane. In this way, the light scanning plane is proximal to the surface of the display screen, such that the accuracy of touch identification of the touch display device is improved, and thus the problem of lower accuracy of touch identification of the touch display device in the related art is addressed, which achieves the effect of improving the accuracy of touch identification of the touch display device.

Optionally, as illustrated in FIG. 3, the display screen 21 is mounted on a wall 31, which is a wall in a scene such as a bank, or a propaganda showroom of a station. Because the wall in the above scene may be curved, the display screen 21 being a curved screen also fits the shape of the wall more closely, such that the applicability of the display screen 21 is improved.

In some optional embodiments, the through-beam unit 22a includes an infrared phototransistor. The infrared phototransistor includes an infrared emitting transistor and an infrared receiving transistor. The infrared emitting transistor is a light emitter consisting of an infrared light emitting diode matrix, and the spectral power distribution of the infrared emitting transistor is a center wavelength of 830 nm to 950 nm. The infrared receiving transistor is a photosensitive receiving diode, which is unidirectionally electrically conductive. The photosensitive receiving diode does not conduct when it is not subjected to light, and when it is subjected to light, the photosensitive receiving diode conducts. The through-beam unit 22a is also a through-beam unit of other invisible light, which is not limited herein.

Optionally, as illustrated in FIG. 2, a preset included angle θ is formed between the extension direction of the light ray s2 emitted by the through-beam unit 22a in at least one of the at least two optical pair transistor groups 22 and a first direction f1. The first direction f1 is a direction perpendicular to the first edge 211, and the preset included angle θ is greater than 0 degrees and less than 90 degrees. That is, the size of the light ray s2 emitted by the through-beam unit 22a in at least one optical pair transistor group 22 is small in a second direction f2, which is a direction perpendicular to the first direction f1. In this way, the light ray s2 emitted by the through-beam unit 22a in at least one optical pair transistor group 22 is proximal to the surface of the display screen 21, and the detection accuracy of the touch display device 20 is improved.

Figure 5:
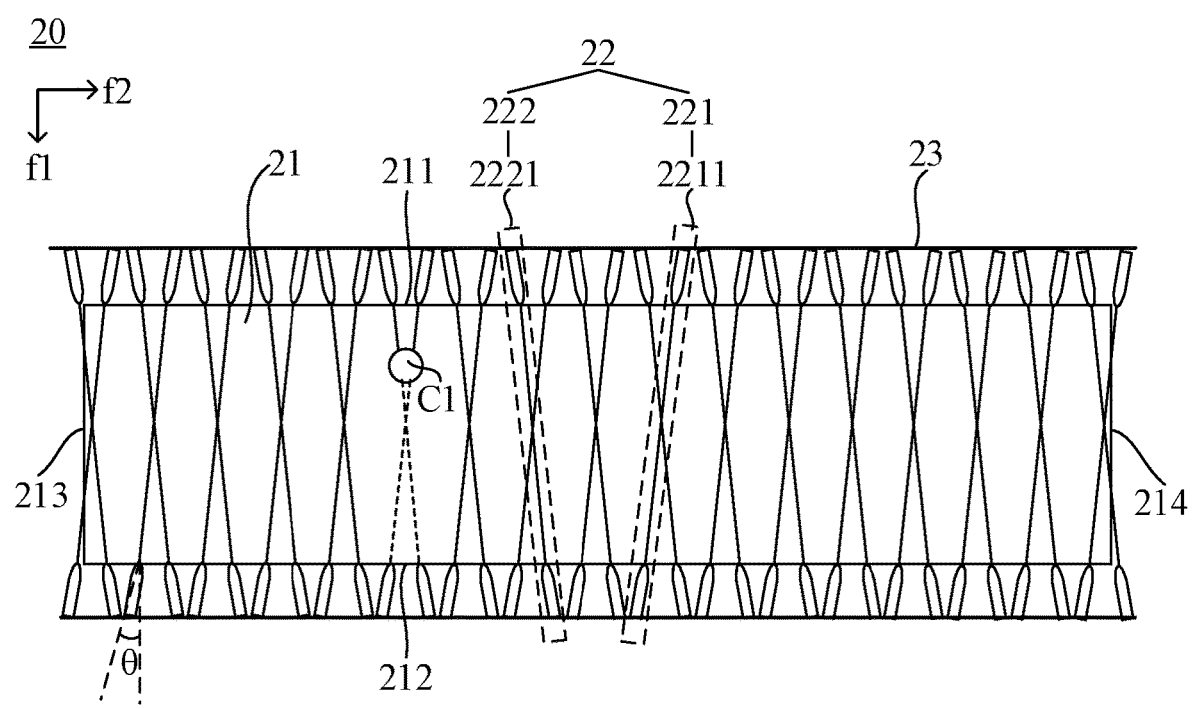
FIG. 5 is a schematic structural diagram of another touch display device according to some embodiments of the present disclosure.

FIG. 5 is a schematic structural diagram of another touch display device according to some embodiments of the present disclosure. As illustrated in FIG. 5, the at least two optical pair transistor groups 22 are mounted in a touch frame 23, and the touch frame 23 is connected to an edge of the display screen 21, such that the at least two optical pair transistor groups 22 are fixed outside the edge of the display screen 21. The touch frame 23 includes a circuit board, and the at least two optical pair transistor groups 22 are electrically connected to the circuit board. Exemplarily, the circuit board includes a flexible circuit board, which is affixed to the first edge 211 and the second edge 212 of the display screen 21.

Optionally, as illustrated in FIG. 5, the first optical pair transistor group 221 includes a first oblique through-beam unit 2211, and the second optical pair transistor group 222 includes a second oblique through-beam unit 2221. A preset included angle θ is formed between an extension direction of the light ray emitted by the first oblique through-beam unit 2211 and the first direction f1 along a clockwise direction, and a preset included angle θ is formed between an extension direction of the light ray emitted by the second oblique through-beam unit 2221 and the first direction f1 along a counterclockwise direction.

The plurality of light rays emitted by the plurality of first oblique through-beam units 2211 in the first optical pair transistor group 221 are parallel, and the plurality of light rays emitted by the plurality of second oblique through-beam units 2221 in the second optical pair transistor group 222 are also parallel, such that the difficulty in mounting the optical pair transistor group 22 is reduced.

Further, a slope of the light ray emitted by the first oblique through-beam unit 2211 is consistent with a slope of the light ray emitted by the second oblique through-beam unit 2221. In this way, an overlapped portion between a region covered by the light rays emitted by the plurality of first oblique through-beam units 2211 and a region covered by the light rays emitted by the second oblique through-beam units 2221 is large, such that the grid-like light scanning plane formed by the first optical pair transistor group 221 and the second optical pair transistor group 222 on the surface of the display screen 21 has a large size, and thus the detection range of the touch display device 20 is increased.

Optionally, an angular range of the preset included angle θ satisfies the following equation.

$$10° \le \theta \le \arctan\left(\frac{2}{L} * \sqrt{R^2 - (R-H)^2}\right)$$

θ represents a preset included angle, L represents a distance between the first edge 211 and the second edge 212, R represents a radius of the first edge 211, and H represents a preset distance between the light ray emitted by the through-beam unit of at least one optical pair transistor group and the display surface of the display screen 21 in a direction perpendicular to the display surface of the display screen 21. The preset distance H ranges from less than or equal to 6 centimeters.

Figure 6:
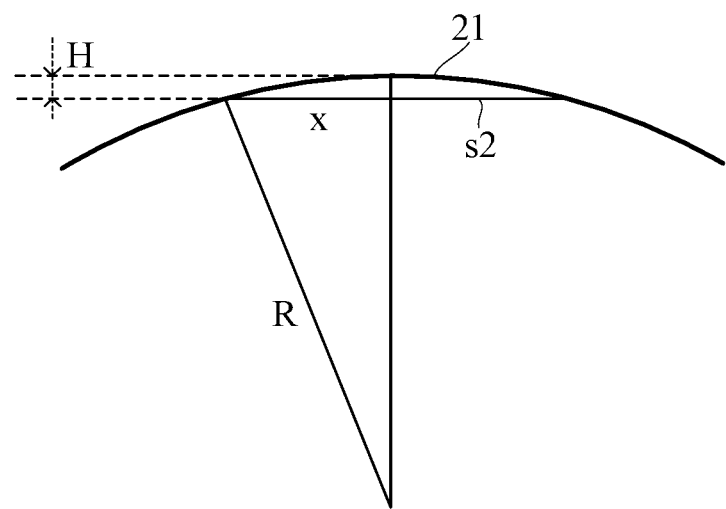
FIG. 6 is a schematic structural diagram of a display screen and a light scanning plane according to some embodiments of the present disclosure.
Figure 7:
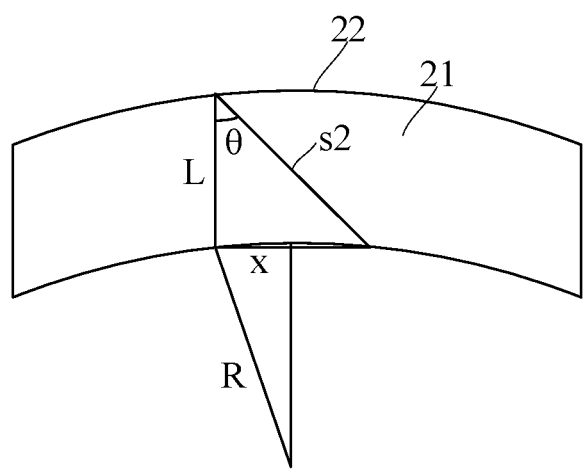
FIG. 7 is a schematic structural diagram of viewing the display screen along a direction perpendicular to the display screen illustrated in FIG. 6.

FIG. 6 is a schematic structural diagram of a display screen and a light scanning plane according to some embodiments of the present disclosure. FIG. 7 is a schematic structural diagram of viewing the display screen along a direction perpendicular to the display screen illustrated in FIG. 6. As illustrated in FIG. 6 and FIG. 7, distances between ends of the light rays emitted by the first oblique through-beam unit 2211 and the second oblique unit 2221 and the display screen 21 are small, and a distance between a center of such light ray and the display screen 21 is maximum. The light rays with different slopes have different distances from the display screen 21. Therefore, the slope of the first oblique through-beam unit 2211 is consistent with the slope of the second oblique unit 2221, such that the distance between the light ray emitted by the first oblique through-beam unit 2211 and the display screen 21 is the same as and the distance between the light ray emitted by the second oblique unit 2221 and the display screen 21.

In the case that the preset distance H is too large, there is the possibility of false identification. Because the user commonly uses an index finger or a stylus to perform touch interaction on the display screen 21, based on a detection length of the index finger or the stylus, it is possible to make H to be less than or equal to 6 cm. In some embodiments, in the case that the radius R of the first edge 211 of the display screen 21 is 10 m and the distance L between the first edge 211 and the second edge 212 is 2 m, θ≤47.5° is acquired by substituting the above parameters into the equation.

In some other embodiments, the radius R of the first edge 211 of the display screen 21 is 6 m, the distance L between the first edge 211 and the second edge 212 is 2.5 m, and H is 5 cm. It is acquired that θ is approximately equal to 31.8°. The preset included angle θ is 30° for practical application.

It should be noted that the above equation $$10° \le \theta \le \arctan\left(\frac{2}{L} * \sqrt{R^2 - (R-H)^2}\right)$$

is derived from the following equation:

$$\left(\frac{L * \tan\theta}{2}\right)^2 + (R-H)^2 = R^2.$$

As illustrated in FIG. 6, the size of the light ray s in the second direction f2 emitted by the first oblique through-beam unit 2211 or the second oblique unit 2221 is 2x. The relation between a half x of the size of the light ray s in the second direction f2 and the radius R of the first edge 211 and the preset distance H satisfies the following relation.

$$x2 + (R-H)^2 = R2$$

As illustrated in FIG. 7, the distance L between the first edge 211 and the second edge 212 and the size 2× of the light ray s in the second direction f2 satisfy the following relation: 2*x=L*tan θ. Accordingly, the relevant equations of the preset included angle θ are derived.

Figure 8:
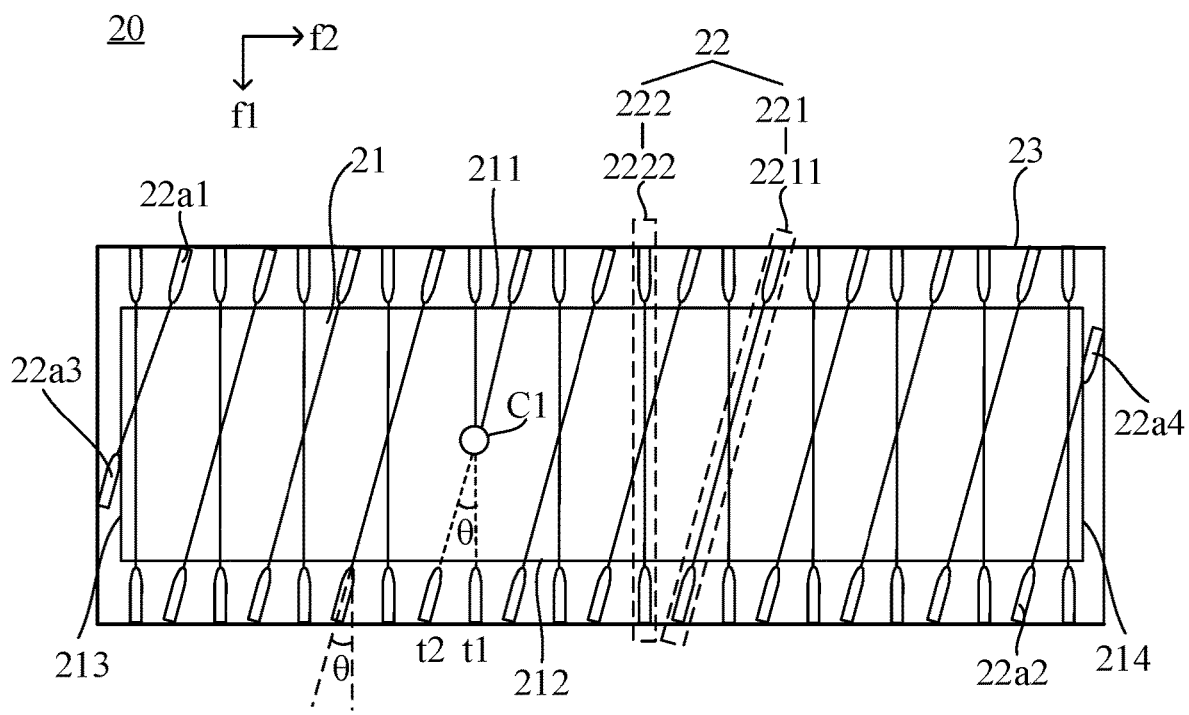
FIG. 8 is a schematic structural diagram of still another touch display device according to some embodiments of the present disclosure.

FIG. 8 is a schematic structural diagram of still another touch display device according to some embodiments of the present disclosure. Optionally, as illustrated in FIG. 8, the first optical pair transistor group 221 includes the first oblique through-beam unit 2211, a preset included angle θ is formed between the extension direction of the light ray emitted by the first oblique through-beam unit 2211 and the first direction f1, the second optical pair transistor group 222 includes a vertical through-beam unit 2222, and an extension direction of the light ray emitted by the vertical through-beam unit 2222 is parallel to the first direction f1. The first direction f1 is determined as an extension direction of the horizontal coordinate of the touch point, and the second direction f2 is determined as an extension direction of the vertical coordinate of the touch point. In the case that the touch point C1 blocks a light ray emitted by the vertical through-beam unit 2222 and a light ray emitted by the first oblique through-beam unit 2211, the coordinates of the vertical through-beam unit 2222 are determined as the horizontal coordinate of the touch point C1, such that there is no need to calculate the horizontal coordinate of the touch point C1, and thus the computational complexity of the touch display device 20 is reduced. The vertical coordinate of the touch point C1 is acquired based on the coordinates of the first oblique through-beam unit 2211 and the preset included angle θ, and the specific position of the touch point C1 is then determined. In some embodiments, the horizontal coordinate of the touch point C1 is t1, and the coordinate of the first oblique through-beam unit 2211 corresponding to the touch point C1 is t2, and thus the vertical coordinate of the touch point C1 is (t1−t2)/tan θ.

Figure 9:
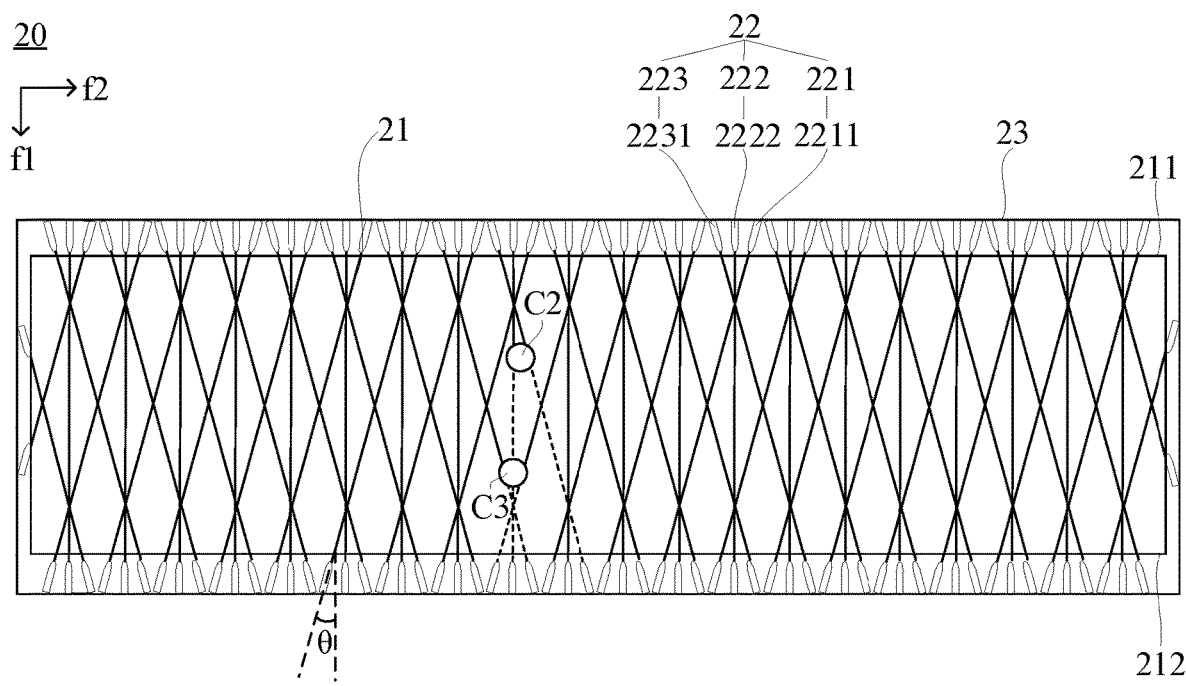
FIG. 9 is a schematic structural diagram of yet still another touch display device according to some embodiments of the present disclosure.

FIG. 9 is a schematic structural diagram of yet still another touch display device according to some embodiments of the present disclosure. Optionally, as illustrated in FIG. 9, the at least two optical pair transistor groups 22 further include a third optical pair transistor group 223. An extension direction of the light ray emitted by the through-beam unit in the third optical pair transistor group 223 is intersected with the extension direction of the light ray emitted by the through-beam unit in the first optical pair transistor group 221 and the extension direction of the light ray emitted by the through-beam unit in the second optical pair transistor group 222. In this way, a grid density of the grid-like light scanning plane formed on the surface of the display screen 21 by the light rays emitted by the at least two optical pair transistor groups 22 is increased, and thus the detection accuracy of the touch display device 20 is improved.

Furthermore, the third optical pair transistor group 223 is configured to discern touch pseudo-points, which refer to touch points, which cannot be accurately identified, generated in the case that the display screen 21 involves simultaneous operation at multiple positions and at least two positions are located on the same light ray. In some embodiments, as illustrated in FIG. 9, in the case that two touch points (a first touch point C2 and a second touch point C3) are present on the display screen 21 at the same time, because the first touch point C2 and the second touch point C3 block the same light ray, the exact position of the second touch point C3 cannot be accurately determined when the touch display device 20 includes two optical pair transistor groups 22.

A plurality of light rays are added by providing the third optical pair transistor group 223, such that the accurate position of the second touch point C3 is determined. In this way, the detection accuracy of the touch display device 20 is improved, and the touch display device 20 is suitable for the operation of simultaneous interaction at multiple positions, such that the applicability of the touch display device 20 is improved.

Optionally, as illustrated in FIG. 9, the first optical pair transistor group 221 includes the first oblique through-beam unit 2211, and a preset included angle θ is formed between the extension direction of the light ray emitted by the first oblique through-beam unit 2211 and the first direction f1 along a clockwise direction. The second optical pair transistor group 222 includes the vertical through-beam unit 2222, and the extension direction of the light ray emitted by the vertical through-beam unit 2222 is parallel to the first direction f1. The at least two optical pair transistor groups 22 further include the third optical pair transistor group 223, and the third optical pair transistor group 223 includes a third oblique through-beam unit 2231. A preset included angle θ is formed between an extension direction of the light ray emitted by the third oblique through-beam unit 2231 and the first direction f1 along a counterclockwise direction.

The slope of the first oblique through-beam unit 2211 is consistent with a slope of the third oblique through-beam unit 2231, In this way, an overlapped portion between the region covered by the light rays emitted by the plurality of first oblique through-beam units 2211 and a region covered by the light rays emitted by the third oblique through-beam units 2231 is large, such that the grid-like light scanning plane formed by the first optical pair transistor group 221 and the second optical pair transistor group 222 on the surface of the display screen 21 has a large size, and thus the detection range of the touch display device 20 is increased.

Moreover, sizes of the grids of the grid-like light scanning planes formed by the at least two optical pair transistor groups 22 on the surface of the display screen 21 are more uniform, such that the detection accuracy of the display screen 21 of the touch display device 20 has a small difference at various positions.

Optionally, as illustrated in FIG. 9, the first optical pair transistor group 221 and the second optical pair transistor group 222 are disposed in the same layer, and the through-beam units in the first optical pair transistor group 221 and the through-beam units in the second optical pair transistor group 222 are alternately arranged in an extension direction of the first edge 211 of the display screen 21.

As illustrated in FIG. 9, the first optical pair transistor group 221, the second optical pair transistor group 222, and the third optical pair transistor group 223 are disposed in the same layer, and the through-beam units in the first optical pair transistor group 221 and the through-beam units in the second optical pair transistor group 222 are alternately arranged in the extension direction of the first edge 211 of the display screen 21

In the case that the interaction content of the touch display device 20 includes only a simple interaction action such as clicking or swiping, the plurality of optical pair transistor groups 22 are disposed in the same layer, and the through-beam units 22a belonging to different optical pair transistor groups 22 are alternately provided. In this way, the structure of the touch display device 20 is simplified under the premise of ensuring that the grid-like light scanning plane formed by the plurality of optical pair transistor groups 22 on the surface of the display screen 21 meets the detection accuracy.

Figure 10:
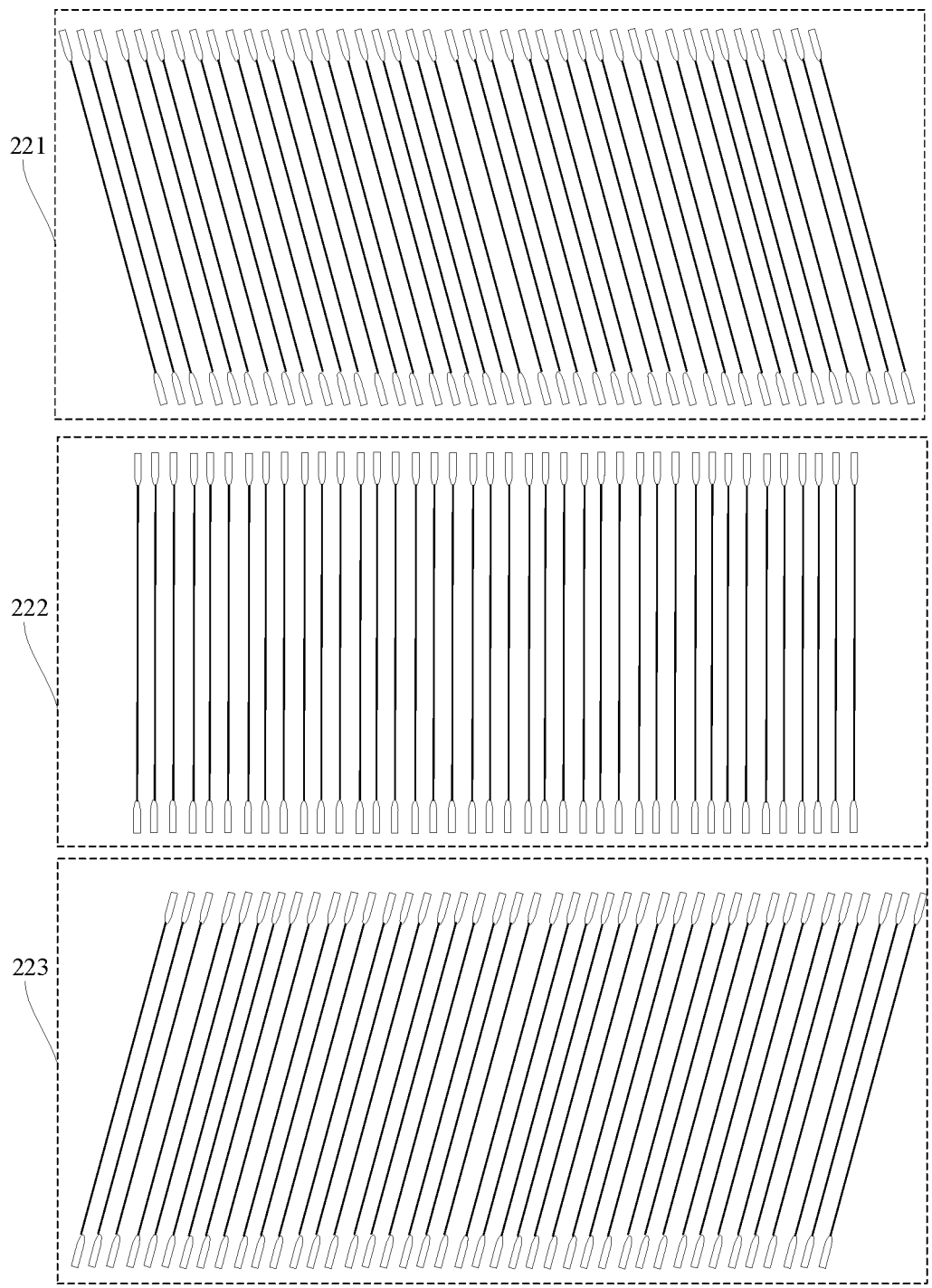
FIG. 10 is a schematic structural diagram of yet still another touch display device according to some embodiments of the present disclosure.

FIG. 10 is a schematic structural diagram of yet still another touch display device according to some embodiments of the present disclosure. Alternatively, in some optional embodiments, as illustrated in FIG. 10, three layers of optical pair transistor groups are illustrated separately in FIG. 10 in order to more clearly illustrate the structure of each layer in the touch display device. The first optical pair transistor group 221 and the second optical pair transistor group 222 are stacked along a direction away from the display screen.

Alternatively, the first optical pair transistor group 221, the second optical pair transistor group 22, and the third optical pair transistor group 223 are stacked in the direction away from the display screen. In this way, the grid density of the grid-like light scanning plane formed on the surface of the display screen 21 by the light rays emitted by at least two optical pair transistor groups 22 is increased, and thus the detection accuracy of the touch display device 20 is improved.

Optionally, as illustrated in FIG. 5, the display screen 21 further has a third edge 213 and a fourth edge 214 that are opposite to each other. Two ends of the third edge 213 are respectively connected to the first edge 211 and the second edge 212, and two ends of the fourth edge 214 are respectively connected to the first edge 211 and the second edge 212.

The sizes of the at least two optical pair transistor groups 22 in the second direction are larger than the sizes of the first edge 211 and the second edge 212, such that the grids of the grid-like light scanning plane formed by the at least two optical pair transistor groups 22 on the surface of the display screen 21 cover the third edge 213 and the fourth edge 214 of the display screen 21, and thus the detection accuracy of the touch display device 29 at the third edge 213 and the fourth edge 214 of the display screen 21 is further improved.

As illustrated in FIG. 8, the at least two optical pair transistor groups 22 further include a supplemental emitter 22a3 and a supplemental receiver 22a4 disposed on outer sides of the third edge 213 and the fourth edge 214. A light outlet of the supplemental emitter 22a3 is oriented toward the light inlet the receiver 22a2 disposed on the outer side of the second edge 212, and a light inlet of the supplemental receiver 22a4 is oriented toward the light outlet of the emitter 22a1 disposed on the outer side of the first edge 211. By providing the supplemental emitter 22a3 and the supplemental receiver 22a4 at the outer side of the third edge 213 and the outer side of the fourth edge 214, the sizes of the at least two pair transistor groups 22 in the second direction f2 are prevented from being too large, and the touch display device 29 is made to have a high detection accuracy at the third edge 213 and the fourth edge 214 of the display screen 21.

In summary, the embodiments of the present disclosure provide a touch display device, which includes the display screen and at least two optical pair transistor groups. The plurality of emitters and the plurality of receivers in the at least two optical pair transistor groups are respectively disposed on the outer sides of two curved edges of the display screen. The extension directions of the light rays emitted by the through-beam units in the at least two optical pair transistor groups are intersected, such that the grid-like light scanning plane is formed on the surface of the display screen, and thus the position of the touch point of the user on the display screen is acquired based on the light scanning plane. In this way, the light scanning plane is proximal to the surface of the display screen, such that the accuracy of touch identification of the touch display device is improved, and thus the problem of lower accuracy of touch identification of the touch display device in the related art is addressed, which achieves the effect of improving the accuracy of touch identification of the touch display device.

Figure 11:
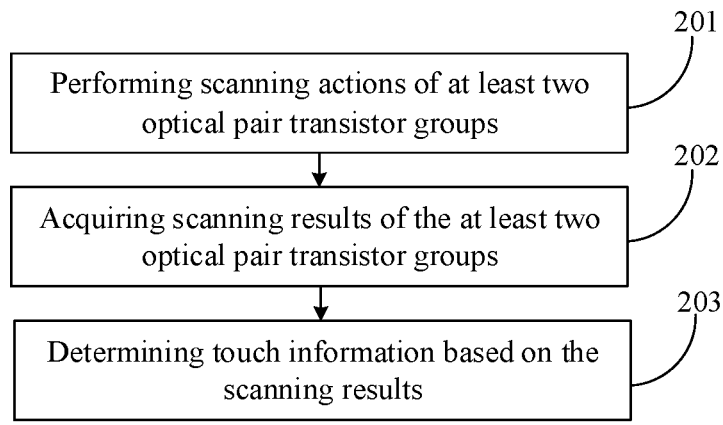
FIG. 11 is a flowchart of a method for controlling a touch display device according to some embodiments of the present disclosure.

FIG. 11 is a flowchart of a method for controlling a touch display device according to some embodiments of the present disclosure. The method is applied to the touch display device in any of the above embodiments. The method includes the following steps.

In step 201, scanning actions of at least two optical pair transistor groups are performed.

In step 202, scanning results of the at least two optical pair transistor groups are acquired.

In step 203, touch information is determined based on the scanning results.

Figure 12:
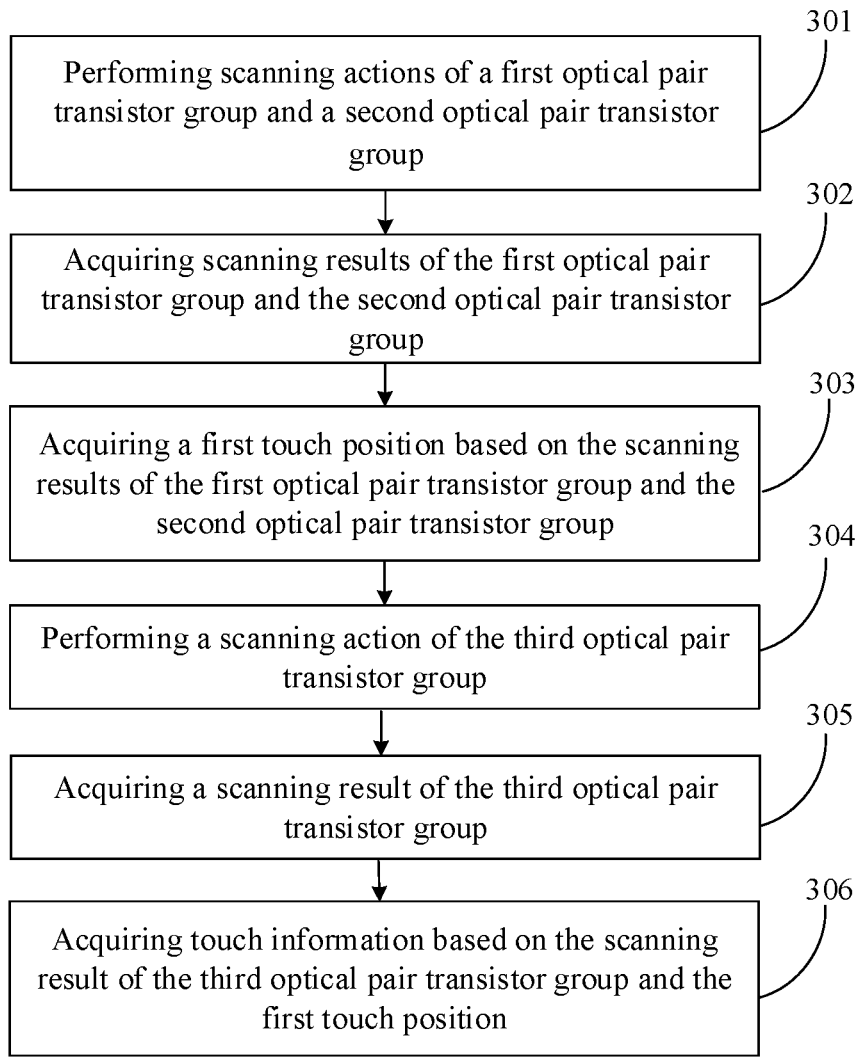
FIG. 12 is a flowchart of another method for controlling a touch display device according to some embodiments of the present disclosure.

FIG. 12 is a flowchart of another method for controlling a touch display device according to some embodiments of the present disclosure. The method includes the following steps.

In step 301, scanning actions of a first optical pair transistor group and a second optical pair transistor group are performed.

Optionally, at least two optical pair transistor groups include the first optical pair transistor group and the second optical pair transistor group. The scanning actions of the at least two optical pair transistor groups being parallel performed indicates that the scanning action of the second optical pair transistor group begins to be performed during a period after the scanning action of the first optical pair transistor group begins to be performed and before the scanning action of the first optical pair transistor group ends.

Step 301 includes the following two sub-steps.
1) The scanning action of the first optical pair transistor groups is performed.
2) The scanning action of the second optical pair transistor group is performed upon a delay of a first period.

The first period is less than a period of performing the scanning action of the first optical pair transistor group.

In this way, the scanning action of the second optical pair transistor group is prevented from affecting the scanning action of the first optical pair transistor group, and a period for performing the scanning actions of at least two optical pair transistor groups is saved.

In step 302, scanning results of the first optical pair transistor group and the second optical pair transistor group are acquired.

The scanning results include a specific position of a through-beam unit to which a light ray blocked by a touch point belongs.

In step 303, a first touch position is acquired based on the scanning results of the first optical pair transistor group and the second optical pair transistor group.

Horizontal and vertical coordinates of the touch point are acquired based on specific positions of the first optical pair transistor group and the second optical pair transistor group.

In step 304, a scanning action of the third optical pair transistor group is performed.

Optionally, the at least two optical pair transistor groups further include a third optical pair transistor group. The scanning action of the third optical pair transistor group is performed after the scanning action of the second optical pair transistor group begins to be performed and a delay a second period. The second period is less than a period of performing the scanning action of the second optical pair transistor group.

In this way, the scanning action of the third optical pair transistor group is prevented from affecting the scanning action of the second optical pair transistor group, and the period of performing the scanning actions of the at least two optical pair transistor groups is saved.

In step 305, a scanning result of the third optical pair transistor group is acquired.

The position of the touch point is determined by another scan of the third optical pair transistor group. In this way, in the case that there are multiple touch points on the display screen, the problem that some of the multiple touch points are not identified is avoided.

In step 306, touch information is acquired based on the scanning result of the third optical pair transistor group and the first touch position.

The third optical pair transistor group is configured to determine touch pseudo-points, such that the detection accuracy of the touch display device is improved.

In summary, the embodiments of the present disclosure provide a method for controlling a touch display device, which is applicable to the touch display device. The touch display device includes the display screen and at least two optical pair transistor groups. The plurality of emitters and the plurality of receivers in the at least two optical pair transistor groups are respectively disposed on the outer sides of two curved edges of the display screen. The extension directions of the light rays emitted by the through-beam units in the at least two optical pair transistor groups are intersected, such that the grid-like light scanning plane is formed on the surface of the display screen, and thus the position of the touch point of the user on the display screen is acquired based on the light scanning plane. In this way, the light scanning plane is proximal to the surface of the display screen, such that the accuracy of touch identification of the touch display device is improved, and thus the problem of lower accuracy of touch identification of the touch display device in the related art is addressed, which achieves the effect of improving the accuracy of touch identification of the touch display device.

Figure 13:
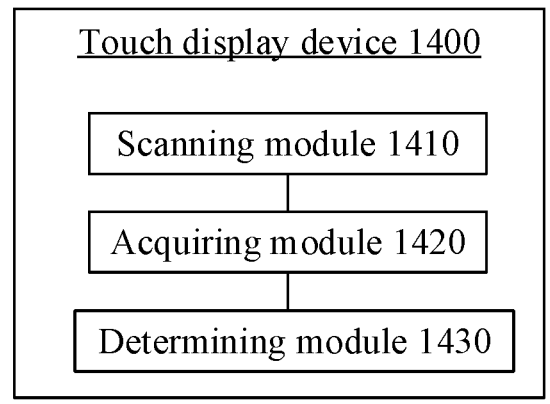
FIG. 13 is a structural block diagram of a touch display device according to some embodiments of the present disclosure.

FIG. 13 is a structural block diagram of a touch display device according to some embodiments of the present disclosure. In some embodiments, the touch display device 1400 further includes a scanning module 1410, configured to perform scanning actions of at least two optical pair transistor groups; an acquiring module 1420, configured to acquire scanning results of the at least two optical pair transistor groups; and a determining module 1430, configured to determine touch information based on the scanning results.

Figure 14:
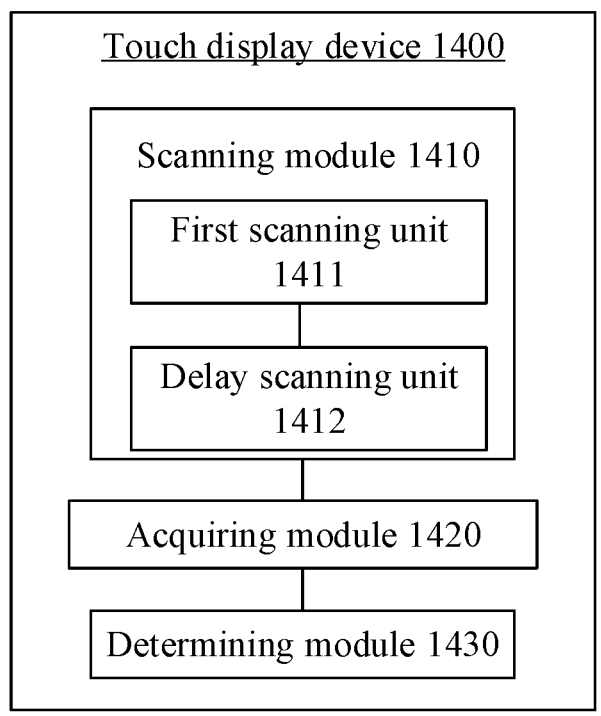
FIG. 14 is a structural block diagram of another touch display device according to some embodiments of the present disclosure.

FIG. 14 is a structural block diagram of another touch display device according to some embodiments of the present disclosure. In some embodiments, a scanning module 1410 includes a first scanning unit 1411, configured to perform a scanning action of a first optical pair transistor group, and a delay scanning unit 1412, configured to perform a scanning action of a second optical pair transistor group after a delay of a first period. The first period is less than a period of performing the scanning action of the first optical pair transistor group.

According to another aspect of the present disclosure, a touch display device is provided. The touch display device includes a processor and a memory storing at least one instruction, at least one program, at least one code set, or at least one instruction set. The processor of the touch display device, under the condition of loading and executing the at least one instruction, the at least one program, the at least one code set, or the at least one instruction set, is caused to perform a method for controlling the touch display device as described above.

According to yet another aspect of the present disclosure, a computer storage medium storing at least one instruction, at least one program, at least one code set, or at least one instruction set is provided. A processor, under the condition of loading and executing the at least one instruction, the at least one program, the at least one code set, or the at least one instruction set, is caused to perform a method for controlling the touch display device as described above.

According to yet still another aspect of the present disclosure, a computer program product or a computer program is provided. The computer program product or the computer program includes at least one computer instruction stored in a computer-readable storage medium. A processor of a computer device, under the condition of loading and executing the at least one computer instruction from the computer-readable storage medium, is caused to perform a method for controlling the touch display device as described above.

It should be noted that in the accompanying drawings, the sizes of layers and regions may be exaggerated for clearer illustration. It should be understood that where an element or layer is referred to as being "on" another element or layer, the element or layer may be directly on another element, or intervening layers therebetween may be present. In addition, it should be understood that where an element or layer is referred to as being "under" another element or layer, the element or layer may be directly under the other element, or there may be more than one intervening layer or element. In addition, it may be further understood that in the case that a layer or element is referred to as being "between" two layers or two elements, the layer may be the only layer between the two layers or two elements, or more than one intervening layer or element may further be present. Like reference numerals indicate like elements throughout.

In the present disclosure, the terms "first," "second," "third," and "fourth" are only used for descriptive purposes, and cannot be understood as indicating or implying relative importance. The term "a plurality of" refers to two or more, unless expressly defined otherwise.

It should be understood that the devices and methods, disclosed in the several embodiments provided in this application, can be realized in other ways. For example, the device embodiments described above are merely schematic, e.g., the division of the units is merely a logical functional division, and may be divided in other ways in the actual implementation. For example, multiple units or components may be combined or may be integrated into another system, or some features may be ignored, or not implemented. Another point is that the mutual coupling, direct coupling, or communication connection illustrated or discussed may be an indirect coupling or communication connection by some interfaces, devices, or units in electrical, mechanical, or other forms.

The units illustrated as separated components may or may not be physically separated, and the components illustrated as units may or may not be physical units, i.e., they may be located in one place or distributed at a plurality of network units. Some or all of these units may be selected to achieve the purpose of the embodiments according to actual needs.

It should be understood by those skilled in the art that all or part of steps in the embodiments as described above may be implemented by hardware, or implemented by relevant hardware instructed by a program, and the program may be stored in a computer-readable storage medium. The storage medium as described above is a read-only memory, a disk, or a light disk.

Described above are merely exemplary embodiments of the present disclosure, and are not intended to limit the present disclosure. Therefore, any modifications, equivalent substitutions, improvements, and the like made within the spirit and principles of the present disclosure shall be included in the protection scope of the present disclosure.

What is claimed is:

1. A touch display device, comprising: a display screen and at least two optical pair transistor groups, wherein
the display screen comprises a curved screen;
the display screen has a first edge and a second edge that are opposite to each other, wherein the first edge and the second edge are both curved;
the at least two optical pair transistor groups comprise a plurality of through-beam units, wherein each of the plurality of through-beam units comprises an emitter and a receiver, the emitter is disposed on an outer side of the first edge, the receiver is disposed on an outer side of the second edge, and a light outlet of the emitter is oriented towards a light inlet of the receiver; and
the at least two optical pair transistor groups comprise a first optical pair transistor group and a second optical pair transistor group, wherein an extension direction of a light ray emitted by a through-beam unit in the first optical pair transistor group is intersected with an extension direction of a light ray emitted by a through-beam unit in the second optical pair transistor group;
a preset included angle is formed between a first direction and the extension direction of the light ray emitted by the through-beam unit in the first optical pair transistor group or the extension direction of the light ray emitted by the through-beam unit in the second optical pair transistor group, wherein the first direction is a direction perpendicular to the first edge, and the preset included angle satisfies the following equation:

$$10° \leq \theta \leq \arctan\left(\frac{2}{L} * \sqrt{R^2 - (R-H)^2}\right);$$

wherein θ represents the preset included angle, L represents a distance between the first edge and the second edge, R represents a radius of the first edge, and H represents a preset distance between the light ray emitted by the through-beam unit of at least one of the optical pair transistor groups and a display surface of the display screen in a direction perpendicular to the display surface of the display screen.

2. The touch display device according to claim 1, wherein
the first optical pair transistor group comprises a first oblique through-beam unit, wherein the preset included angle is formed between an extension direction of a light ray emitted by the first oblique through-beam unit and the first direction along a clockwise direction; and
the second optical pair transistor group comprises a second oblique through-beam unit, wherein the preset included angle is formed between an extension direction of a light ray emitted by the second oblique through-beam unit and the first direction along a counterclockwise direction.

3. The touch display device according to claim 1, wherein
the first optical pair transistor group comprises a first oblique through-beam unit, wherein the preset included angle is formed between an extension direction of a light ray emitted by the first oblique through-beam unit and the first direction; and
the second optical pair transistor group comprises a vertical through-beam unit, wherein an extension direction of a light ray emitted by the vertical through-beam unit is parallel to the first direction.

4. The touch display device according to claim 1, wherein the at least two optical pair transistor groups further comprise a third optical pair transistor group, wherein an extension direction of a light ray emitted by a through-beam unit in the third optical pair transistor group is intersected with the extension direction of the light ray emitted by the through-beam unit in the first optical pair transistor group and the extension direction of the light ray emitted by the through-beam unit in the second optical pair transistor group.

5. The touch display device according to claim 1, wherein
the first optical pair transistor group comprises a first oblique through-beam unit, wherein the preset included angle is formed between an extension direction of a light ray emitted by the first oblique through-beam unit and the first direction along a clockwise direction;
the second optical pair transistor group comprises a vertical through-beam unit, wherein an extension direction of a light ray emitted by the vertical through-beam unit is parallel to the first direction; and
the at least two optical pair transistor groups further comprise a third optical pair transistor group, wherein the third optical pair transistor group comprises a third oblique through-beam unit, and the preset included angle is formed between an extension direction of a light ray emitted by the third oblique through-beam unit and the first direction along a counterclockwise direction.

6. The touch display device according to claim 1, wherein
the first optical pair transistor group and the second optical pair transistor group are disposed in a same layer, and through-beam units in the first optical pair transistor group and through-beam units in the second optical pair transistor group are alternately arranged in an extension direction of the first edge of the display screen; or
the first optical pair transistor group and the second optical pair transistor group are stacked along a direction away from the display screen.

7. The touch display device according to claim 4, wherein
the first optical pair transistor group, the second optical pair transistor group, and the third optical pair transistor group are disposed in a same layer, and through-beam units in the first optical pair transistor group, through-beam units in the second optical pair transistor group, and through-beam units in the third optical pair transistor group are alternately arranged in an extension direction of the first edge of the display screen; or
the first optical pair transistor group, the second optical pair transistor group, and the third optical pair transistor group are stacked along a direction away from the display screen.

8. The touch display device according to claim 1, wherein
the display screen further has a third edge and a fourth edge that are opposite to each other, wherein two ends of the third edge are respectively connected to the first edge and the second edge, and two ends of the fourth edge are respectively connected to the first edge and the second edge; and
the at least two optical pair transistor groups further comprise a supplemental emitter and a supplemental receiver that are disposed on outer sides of the third edge and the fourth edge, wherein a light outlet of the supplemental emitter is oriented towards the light inlet of the receiver disposed on the outer side of the second edge, and a light inlet of the supplemental receiver is oriented towards the light outlet of the emitter disposed on the outer side of the first edge.

9. A method for controlling a touch display device, applicable to the touch display device as defined in claim 1, the method comprising:
  performing scanning actions of at least two optical pair transistor groups;
  acquiring scanning results of the at least two optical pair transistor groups; and
  determining touch information based on the scanning results;
  the at least two optical pair transistor groups comprise a first optical pair transistor group, a second optical pair transistor group, and a third optical pair transistor group;
  performing the scanning actions of the at least two optical pair transistor groups comprises:
    performing a scanning action of the first optical pair transistor group; and
    performing a scanning action of the second optical pair transistor group upon a first period after a start of the scanning action of the first optical pair transistor group;
  wherein the first period is less than a period of performing the scanning action of the first optical pair transistor group;
  determining the touch information based on the scanning results comprises:
    acquiring scanning results of the first optical pair transistor group and the second optical pair transistor group, and acquiring a first touch position based on the scanning results of the first optical pair transistor group and the second optical pair transistor group; and
    acquiring a scanning result of the third optical pair transistor group, and acquiring the touch information based on the scanning result of the third optical pair transistor group and the first touch position.

10. A touch display device, comprising: a processor and a memory storing at least one instruction, at least one program, at least one code set, or at least one instruction set, wherein the processor, under a condition of loading and executing the at least one instruction, the at least one program, the at least one code set, or the at least one instruction set, is caused to perform the method for controlling the touch display device as defined in claim 9.

11. A non-transitory computer storage medium, storing at least one instruction, at least one program, at least one code set, or at least one instruction set, wherein a processor, under a condition of loading and executing the at least one instruction, the at least one program, the at least one code set, or the at least one instruction set, is caused to perform the method for controlling the touch display device as defined in claim 9.

12. The method for controlling the touch display device according to claim 9, wherein a preset included angle is formed between a first direction and an extension direction of a light ray emitted by a through-beam unit in the first optical pair transistor group or an extension direction of a light ray emitted by a through-beam unit in the second optical pair transistor group, wherein the first direction is a direction perpendicular to the first edge, and the preset included angle is greater than 0 degrees and less than 90 degrees.

13. The method for controlling the touch display device according to claim 12, wherein
  the first optical pair transistor group comprises a first oblique through-beam unit, wherein the preset included angle is formed between an extension direction of a light ray emitted by the first oblique through-beam unit and the first direction along a clockwise direction; and
  the second optical pair transistor group comprises a second oblique through-beam unit, wherein the preset included angle is formed between an extension direction of a light ray emitted by the second oblique through-beam unit and the first direction along a counterclockwise direction.

14. The method for controlling the touch display device according to claim 12, wherein
  the first optical pair transistor group comprises a first oblique through-beam unit, wherein the preset included angle is formed between an extension direction of a light ray emitted by the first oblique through-beam unit and the first direction; and
  the second optical pair transistor group comprises a vertical through-beam unit, wherein an extension direction of a light ray emitted by the vertical through-beam unit is parallel to the first direction.

15. The method for controlling the touch display device according to claim 9, wherein the at least two optical pair transistor groups further comprise a third optical pair transistor group, wherein an extension direction of a light ray emitted by a through-beam unit in the third optical pair transistor group is intersected with the extension direction of the light ray emitted by the through-beam unit in the first optical pair transistor group and the extension direction of the light ray emitted by the through-beam unit in the second optical pair transistor group.

16. The method for controlling the touch display device according to claim 12, wherein
  the first optical pair transistor group comprises a first oblique through-beam unit, wherein the preset included angle is formed between an extension direction of a light ray emitted by the first oblique through-beam unit and the first direction along a clockwise direction;
  the second optical pair transistor group comprises a vertical through-beam unit, wherein an extension direction of a light ray emitted by the vertical through-beam unit is parallel to the first direction; and
  the at least two optical pair transistor groups further comprise a third optical pair transistor group, wherein the third optical pair transistor group comprises a third oblique through-beam unit, and the preset included angle is formed between an extension direction of a light ray emitted by the third oblique through-beam unit and the first direction along a counterclockwise direction.

* * * * *